United States Patent [19]

Atkinson et al.

[11] 4,248,664

[45] Feb. 3, 1981

[54] FIBROUS SHEET MATERIALS

[75] Inventors: Alan W. Atkinson, Rochdale; Richard H. Clucas, Formby; Robert A. Lancaster, Rochdale; Allen M. Perkins, Hale, all of England

[73] Assignee: Turner & Newall Limited, Manchester, England

[21] Appl. No.: 48,017

[22] Filed: Jun. 13, 1979

[30] Foreign Application Priority Data

Jun. 20, 1978 [GB] United Kingdom ............... 27339/78

[51] Int. Cl.³ .............................................. D21H 5/18
[52] U.S. Cl. ..................... 162/145; 162/152; 162/156; 162/181 R; 162/181 D
[58] Field of Search ........... 162/145, 152, 175, 181 D, 162/156; 106/8 S, 288 B

[56] References Cited

U.S. PATENT DOCUMENTS

| 2,773,763 | 12/1956 | Scott | 162/145 |
|---|---|---|---|
| 3,470,062 | 9/1969 | Ollinger | 162/152 |
| 3,510,394 | 5/1970 | Cadotte | 162/152 |
| 3,549,485 | 12/1970 | Eckert | 162/181 D |

Primary Examiner—Peter Chin
Attorney, Agent, or Firm—Cushman, Darby & Cushman

[57] ABSTRACT

A board product containing glassy inorganic fibre such as mineral wool, in a matrix of a plastic clay such as ball clay. The amounts of clay and inorganic fibre are in the respective ranges 29 to 80 percent by weight and 15 to 55 percent by weight of the product, and its density is at least 500 kg/m³.

The board can replace asbestos millboard and has the advantage of being asbestos-free. It can be made by the standard paper and board-making techniques, when preferred ingredients are pulp fibres e.g. cellulose pulp, and a complementary binder, particularly hydrolyzable starch, the latter enabling the product to be re-mouldable upon moistening with water.

8 Claims, No Drawings

FIBROUS SHEET MATERIALS

This invention relates to fibrous sheet materials, and in particular to sheet materials such as board based on inorganic fibres.

Conventional asbestos-based millboards consist of 50 to 97% of asbestos fibre together with various fillers and binders. They have excellent properties owing to the high strength and temperature resistance of asbestos fibres and a density of about 1000 kg/m$^3$. They can be made by paper or board making processes in which an aqueous suspension of the ingredients is applied to a sieve or filter medium through which the water drains to leave a moist tissue or felt. These felts are usually pressed or rolled into sheets, either individually or plied together to give a laminated structure. Non-flat shapes, which could be difficult to make by moulding flat sheets, can be produced directly using foraminous formers of the desired shape.

It is desirable to replace the asbestos fibres in these materials, but direct replacement of the fibres is very difficult since asbestos fibres can be processed like textile fibres and yet have the temperature resistance, non-flammability and strength of mineral fibres.

The properties demanded from conventional millboards, and which must be matched by any replacement, are:

(1) Good high temperature properties i.e. low organic content to ensure non-combustibility and good retention of properties after exposure to elevated temperatures.

(2) Adequate strength and flexibility (tensile and flexural strengths in excess of 2 MPa and 4 MPa respectively are usually required).

(3) A sufficiently low density (e.g. less than 1200 Kg/m$^3$) to provide adequate insulation properties.

(4) Ideally the ability to soften and reshape the product by moistening.

(5) A reasonably low price.

(6) The ability to be rapidly formed into sheets—preferably by a continuous process. Ideally this should be possible using existing asbestos processing equipment.

(7) The ability to be punched into various shapes with clean-cut edges and without delamination.

We have now found that by judicious choice of materials and their amounts replacement products can be made with very promising properties.

Thus the present invention provides a board product comprising a matrix of a plastic clay reinforced with a glassy inorganic fibre the amounts of clay and inorganic fibre being in the respective ranges 29 to 80 percent by wt and 15 to 55 percent by weight and the density of the product being at least 500 kg/m$^3$.

Preferably the board product contains also a complementary binder with minimal combustibility. Ball clay is a well-known high-plasticity clay which is widely used in the ceramics industry, and is usually fired to produce the final product.

We have found that the plastic clay, such as ball clay, used in this invention has several advantages over other types of clay, such as Kaolin or china clay, in that it gives better dry strength, improved wet mouldability, better interlaminar adhesion during manufacture and better interlaminar adhesion when dry. Clearly, for the board product to be remouldable, ball clay must not be fired during preparation of the board.

The preferred glassy inorganic fibres are glassy wools including so called glass wool, mineral wool and ceramic fibre. Of these materials mineral wool offers the most attractive combination of temperature resistance and low cost. As produced, however, mineral wools contain too much non-fibrous shot to give a satisfactory board product, and a substantial part of the shot must be removed either before or during board production. The glass or mineral wool may be given a silane pre-treatment to promote adhesion to the binder, and preferably is treated with a dispersing agent, e.g. a surfactant.

The length of the inorganic fibres is usually reduced during the manufacture of the board and it is difficult to lay down specific limits for the length required. The fibre must be short enough to be initially dispersed and to give an even distribution in the product and to avoid balling-up of the fibre. On the other hand the fibre should be long enough to provide adequate reinforcement in the board.

These inorganic fibres do not behave like textiles in the same way as asbestos fibres. It is preferable to include also an open organic fibre, eg in the form of a pulp, to give wet and dry strength, flexibility and the ability to use conventional paper or board making machinery. Cellulose pulp is preferred, wood pulp with long, fine fibres being the best although other pulps can give satisfactory results at less cost.

The function of the organic fibres is important, in that during board making the pulp fibres form a web on a sieve to carry the other materials out of slurry, and after the board is formed they give green strength to the material before the binder has set.

The inorganic fibres are a major constituent of the material in terms of percentage by weight, 18 to 52 percent by weight preferably being used (smaller percentages being used when the fibres are longer), more preferably 23 to 42 percent by weight. The organic fibres are to be kept to minimum proportions owing to their combustibility and 3 to 7 percent of pulp fibres will normally be sufficient. Cellulose fibre is preferred as the organic fibre because of its superior web-forming properties in the wet state and its low combustibility in comparison with synthetic pulp fibres such as polyolefines (e.g. polypropylene, polyethylene).

The ball clay or other plastic clay is included in the board product to keep down cost, to contribute to various properties of the board including temperature resistance and mechanical strength both during and after manufacture. The ball clay also provides a cohesive matrix in the material owing to its plastic nature.

The ball clay will preferably constitute 34 to 67 percent by weight of the board product, depending upon the other binder used, and more preferably will constitute 42 to 62 percent by weight of the board product: more clay being employed when greater length has permitted reduction in the inorganic fibre content.

Reinforcing fillers such as fibrous wollastonite, mica and waste calcium silicate insulation can be included in amounts up to a total of less than 10% by weight.

As complementary binder one or more of several types of material may be employed. Those used in colloidal or latex form, rather than solution, are preferred and typical examples are hydrolysed starch, or finely divided clays such as bentonite or montmorillonite. Binders used in the forms of true solutions such as soluble cellulose derivatives and sodium silicate are not preferred because they are only partly retained in the materials in conventional wet processing. The preferred binders are based on starch, more preferably Farina starch, which has been found to be most effective.

Bentonite clay provides a binding effect and also assists in controlling the drainage rate of water through a sieve when the layer is being laid down on a sieve or filter medium during board production. It may be used in an amount up to 5 percent by weight.

Preferably the binder includes hydrolysable Farina starch in an amount of 1.5 to 5.0 percent by weight of the board product, since starch gives dry strength but softens when wet to facilitate wet mouldability.

Dry-strength resins of the type used in the paper industry can be used to improve the strength of the material although not as sole binder, and only in minor quantities eg. up to 0.5% by weight.

In order to minimize the flammability introduced by the organic constituents it may be useful to incorporate small quantities of flame retardant. These should be selected to suit the particular organic materials employed but ammonium hydrogen phosphates, boric acid or other borates, have been found to be effective.

The fibrous sheet material may be prepared by the same paper or board making processes as are used for asbestos-based boards.

The invention is illustrated by the following Examples.

EXAMPLES 1 TO 7

Sample boards were made to seven different formulations. In each case the boards were prepared by mixing the ingredients as an aqueous suspension (each being added in the order shown except the Silane which was applied to the mineral wool as a pre-treatment), applying to a sieve, dewatering, pressing at 7 MPa pressure and drying at 120°–130° C. The seven formulations are tabulated below in Table I. The (dry) density and tensile and flexural strengths of the sample boards were measured and the results obtained are also tabulated below in Table I.

TABLE 1

| Example | 1 | 2 | 3 | 4 | 5 | 6 | 7 |
|---|---|---|---|---|---|---|---|
| Mineral wool (short fibre -2mm) | 35 | — | 35 | 35 | 30 | 30 | 30 |
| Mineral wool (long fibre -8mm) | — | 16 | — | — | — | — | — |
| Ball clay (Hymod BL2) | 53.5 | 77.3 | 56.5 | 56.3 | 56.5 | 56.5 | 58.5 |
| Bentonite (Wyoming) | 2.5 | — | 2.5 | 2.5 | 2.5 | 2.5 | 2.5 |
| Refined Lapponia wood pulp | 6 | 3 | 3 | 3 | 3 | 3 | 2 |
| Hydrolysed Farina starch | 3 | 2.5 | 3 | 3 | 3 | 3 | 2 |
| Mica flake | — | — | — | — | 5 | — | 5 |
| Exfoliated vermiculite | — | — | — | — | — | 5 | — |
| Retention aid (Percol 224) | — | 0.05 | — | 0.05 | — | — | — |
| Dry strength resin | — | 0.2 | — | 0.2 | — | — | — |
| Boric acid | — | 1 | — | — | — | — | — |
| Properties |  |  |  |  |  |  |  |
| Density (Kg/m³) | 1100 | 1175 | 815 | 740 | 950 | 843 | 681 |
| Tensile Strength (MPa) | 11.2 | 4.4 | 4.2 | 4.1 | 7.1 | 6.7 | 5.3 |
| Flexural Strength (MPa) | — | — | — | 4.5 | 12 | 11 | 3 |

"Percol" is the Registered Trade Mark of Allied Colloids Limited.

EXAMPLES 8 TO 11

To investigate the influence of starch content on the mechanical strength of the material four different boards were made using different furnishes on a pilot-scale Hatscheck board-making machine. In the latter the furnish is slurried in water and fed to a vat in which a drum having a surface of a fine sieve material such as wire mesh is partially immersed. The drum ends are provided with face seals against the sides of the vat, and water is withdrawn from the interior of the drum through the drum end so that water flows inwardly into the drum depositing a layer of the solids from the slurry on the mesh sieve. This is carried out of the vat by rotation of the drum and deposited from the drum onto a felt which conveys the layer and on which the layer is dewatered. From the felt the layer is passed onto a drum upon which it is wound until a predetermined thickness has built up. Then the material on the drum is slit and removed as a sheet.

The table II below gives details of the compositions from which the boards are made, and their density and tensile strength. Satisfactory boards were obtained at all the starch concentrations illustrated (2, 3, 4 and 5 percent). There is a need to limit the amount of starch needed in order to keep down the content of potentially inflammable organic material in the board, but a minimum amount is needed to achieve the necessary binder function. The preferred content is 1.5% to 5.0% by weight of the board as indicated previously.

TABLE II

| Example No. | 8 | 9 | 10 | 11 |
|---|---|---|---|---|
| Constituent | % Dry Wt. | | | |
| Wood Pulp | 5.0 | 5.0 | 5.0 | 5.0 |
| Mica | 5.0 | 5.0 | 5.0 | 5.0 |
| Bentonite | 2.5 | 2.5 | 2.5 | 2.5 |
| Ball Clay | 55.5 | 54.5 | 53.5 | 52.5 |
| Swedish Rockwool | 30.0 | 30.0 | 30.0 | 30.0 |
| Farina Starch | 2.0 | 3.0 | 4.0 | 5.0 |
| "Percol" E24 (Retention Aid) | 0.005 | 0.005 | 0.005 | 0.005 |
| Properties | | | | |
| Density Kg/m hu 3 | 995 | 740 | 993 | 985 |
| Tensile Strength MPa | 4.4 | 5.4 | 5.1 | 6.4 |

EXAMPLES 12 TO 18

To illustrate the influence of mineral wool content on the mechanical strength of boards made on a pilot-scale Hatscheck machine a series of boards were made to seven different furnishes. The compositions of the seven different furnishes and the density and tensile strength of the boards made from them are given in Table III below. As can be seen, the most successful compositions were Examples 14, 15 and 16 in the middle of the range of compositions tested. Example 12 was a product which could be made, but the composition was rather too sticky during manufacture and was not preferred. Example 18 gave a product whose strength was rather lower than desirable and likewise was not preferred.

TABLE III

| Example No. | 12 | 13 | 14 | 15 | 16 | 17 | 18 |
|---|---|---|---|---|---|---|---|
| Constituent | % Dry Wt. | | | | | | |
| Wood Pulp | 5.0 | 5.0 | 5.0 | 5.0 | 5.0 | 5.0 | 5.0 |
| Mica | 5.0 | 5.0 | 5.0 | 5.0 | 5.0 | 5.0 | 5.0 |
| Bentonite | 2.5 | 2.5 | 2.5 | 2.5 | 2.5 | 2.5 | 2.5 |
| Ball Clay | 69.5 | 64.5 | 59.5 | 49.5 | 44.5 | 34.5 | 29.5 |
| Swedish Rockwool | 150.0 | 20.0 | 25.0 | 35.0 | 40.0 | 50.0 | 55.0 |
| Farina Starch | 3.0 | 3.0 | 3.0 | 3.0 | 3.0 | 3.0 | 3.0 |
| "Percol" E24 (Retention Aid) | 0.005 | 0.005 | 0.005 | 0.005 | 0.005 | 0.005 | 0.005 |
| Properties | | | | | | | |
| Density kg/m$^3$ | 900 | 1010 | 1140 | 1130 | 1080 | 970 | 910 |
| Tensile Strength MPa | 5.0 | 4.5 | 6.5 | 6.8 | 5.6 | 4.8 | 3.5 |

We claim:

1. In a process for the production of a non-combustible asbestos-free board product comprising a matrix of ball clay reinforced with glassy inorganic fiber, including the steps of:
(i) dewatering on a sieve or other filter medium an aqueous suspension containing glassy inorganic fiber and ball clay as the major ingredients, with a small proportion of starch as binder, and
(ii) subsequently setting the dewatered suspension at elevated temperature, the improvement which consists in:
(a) employing as the aqueous suspension one which has a higher content of ball clay than of glassy inorganic fiber and which also contains organic web-forming fibers, the proportions of the various ingredients by weight of total solids in the suspension being:

| | |
|---|---|
| unfired ball clay | 42–67% |
| glassy inorganic fiber | 18–42% |
| starch | 1.5–5% |
| organic web-forming fiber | up to 7% | in combination with
(b) limiting the setting at elevated temperature to a drying procedure which is carried out
(b1) until the board product has a tensile strength greater than 2 MPa and a density at least 500 kg/m$^3$ but less than 1200 kg/m$^3$, and
(b2) so as to leave the ball clay in the unfired state and the starch content in the range 1.5–5% by weight, to obtain a board product which is remoldable when rewetted with water.

2. A process according to claim 1, in which said aqueous suspension contains 42–62% by weight of unfired ball clay, and 23–42% by weight of glassy inorganic fiber.

3. A process according to claim 1, in which the glassy inorganic fiber is mineral wool.

4. A process according to claim 1, in which the organic web-forming fiber is cellulose fiber.

5. A process according to claim 1, in which the starch is farina starch.

6. A process according to claim 1, in which said aqueous suspension contains bentonite clay in an amount up to 5% by weight of total solids.

7. A process according to claim 1, in which said aqueous suspension contains mica in an amount of about 5% by weight of total solids.

8. A non-combustible asbestos-free board product having a matrix of a plastic clay reinforced with a glassy inorganic fiber and remoldable when wetted by water produced by the process of claim 1.

* * * * *